United States Patent
Hebberd

(10) Patent No.: US 6,278,920 B1
(45) Date of Patent: Aug. 21, 2001

(54) METHOD FOR ANALYZING AND FORECASTING COMPONENT REPLACEMENT

(76) Inventor: James O. Hebberd, 690 Grouse Creek Rd., Grants Pass, OR (US) 97526

(*) Notice: Subject to any disclaimer, the term of this patent is extended or adjusted under 35 U.S.C. 154(b) by 0 days.

(21) Appl. No.: 09/597,675

(22) Filed: Jun. 19, 2000

(51) Int. Cl.$^7$ ........................................................ G01B 3/44
(52) U.S. Cl. ........................... 701/29; 702/108; 702/127
(58) Field of Search ........................... 701/29, 30, 31, 701/34, 35, 36, 39, 33; 340/500; 324/500, 509, 512; 702/108, 116, 127

(56) References Cited

U.S. PATENT DOCUMENTS

| | | | |
|---|---|---|---|
| 5,195,046 | * 3/1993 | Gerardi et al. | 702/35 |
| 5,625,664 | * 4/1997 | Berkley | 378/58 |
| 6,226,597 | * 5/2001 | Eastman et al. | 702/34 |

OTHER PUBLICATIONS

"Reliability: Management, Methods, and Mathematics", Second Edition, by David K. Lloyd and Myron Lipow published by Prentice–Hall, Fifth Printing, 1984, pp. 303–305, and 546–550.

\* cited by examiner

*Primary Examiner*—Tan Nguyen
*Assistant Examiner*—Marthe Marc-Coleman
(74) *Attorney, Agent, or Firm*—Cahill, Sutton & Thomas, P.L.C.

(57) ABSTRACT

A computerized method for quantifying confidence in a replacement schedule for components that must be routinely replaced within a fleet of aircraft or like equipment includes programming a computer to accept predetermined input data, including anticipated life expectancy T, indicated reliability $R_1$, the population P of the component in the fleet, and the number of failed units F replaced over a time increment t. The method computes the minimum-mean-time-between-removals $\theta_1$, and the upper limit on unreliability $P_u$ based upon such input data. The computer compares two or more of such factors to a series of Gamma Confidence Level look-up tables, and either determines a Gamma Confidence Level for the user, or prompts the user to modify the input data so that a Gamma Confidence Level can be determined. If the resulting Gamma Confidence Level is too low, the anticipated life expectancy T is reduced, and the method is repeated. The component is scheduled for replacement when the usage of the component reaches the computed minimum-mean-time-between-removals $\theta_1$.

6 Claims, 2 Drawing Sheets

METHOD FOR ANALYZING AND FORECASTING COMPONENT REPLACEMENT

BACKGROUND OF THE INVENTION

1. Field of the Invention

The present invention relates generally to methods of quality control and reliability employed by maintenance supervisors for ensuring safety of components used in a fleet of equipment, and more particularly, to a computerized method for determining a confidence level in a schedule for removing and replacing such component within the fleet.

2. Description of the Related Art

In the field of aircraft maintenance, safety and reliability dictate that maintenance be scheduled at periodic intervals to replace critical components before they fail. Apart from safety concerns, it is generally less expensive and more convenient to take equipment out of service at regular scheduled maintenance intervals to replace components before they fail than to expedite the replacement of a component that has already failed. Particularly in the aircraft industry, unexpected component failures tend to cause flight delays and cancellations that airline companies can ill afford. Safety and reliability concerns are likewise critical for other industries, including commercial trucking, communications, and military weapons and monitoring systems. If component replacement is put off for too long, safety and reliability are compromised, and the cost of post-failure replacement in terms of the potential loss of human life and property damage can be significant. On the other hand, if a component replacement schedule is overly conservative, then maintenance costs are unnecessarily increased by excessive labor and inventory costs; likewise, frequent removal of the equipment from the active fleet also tends to unnecessarily increase the costs of operating the fleet.

Present methods for analyzing the reliability of components in a fleet of vehicles include the simple use of the anticipated life expectancy recommended by the manufacturer of the component. Using this approach, a component is replaced just before the component has been in use for its anticipated life expectancy. However, this simplistic approach typically results in a significant number of components failing. More rigorous approaches have been used in the past, but their complexity, and the difficulty of interpreting their results, has probably discouraged maintenance supervisors from using such methods on any regular basis thus far.

Accordingly, it is an object of the present invention to provide a method for forecasting and analyzing failures of a component installed in a "fleet" of aircraft, trucks, or any other equipment.

Another object of the present invention is to provide such a method that is easy to implement and operate, and which can be repeated and updated at frequent intervals to analyze and adjust component replacement schedules as changed circumstances dictate.

Yet another object of the present invention is to provide such a method that can utilize actual historical data for the reliability of a component under study within a particular fleet in lieu of, and/or in supplementation of, reliability data provided by a manufacturer of such component.

Still another object of the present invention is to provide such a method which permits a manufacturer to reduce the size of its inventory of spare repair/replacement components.

A further object of the present invention is to provide such a method which reliably guides a maintenance supervisor in scheduling component maintenance for convenient, less-expensive, down times but which does not increase maintenance costs by unnecessarily replacing components before it is really necessary to do so.

A still further object of the present invention is to quickly correct reliance upon overly-optimistic life expectancy specifications supplied by the component vendor.

Another object of the present invention is to provide such a method that can be used in conjunction with a component that is incorporated within virtually any type of equipment for which reliability is impacted by the number of operating hours and/or cycles to which the component is subjected.

Still another object of the present invention is to provide such a method which can be performed with the assistance of a conventional desktop or laptop personal computer.

These and other objects of the present invention will become more apparent to those skilled in the art as the description of the present invention proceeds.

SUMMARY OF THE INVENTION

Briefly described, and in accordance with a preferred embodiment thereof, the present invention is a method for establishing a confidence level in a replacement schedule for a component used within a group of machines, such as aircraft or the like, wherein the method includes the step of selecting an anticipated life expectancy T for the component. The method also includes the step of establishing an indicated reliability $R_1$ for the component, which in some cases may be computed based upon the anticipated life expectancy T. The method also includes the steps of establishing a time increment t over which one or more units of the component had to be removed due to a failure, as well as establishing the number of failed units F of the component that had to be replaced over such time increment t. The method also includes the step of determining the population of the component within a particular group of such machines under study.

The method of the present invention computes a minimum-mean-time-between-removals $\theta_1$ based upon the anticipated life expectancy T and the indicated reliability $R_1$; the present method also computes an upper limit on unreliability $P_u$ based upon time increment t and the minimum-mean-time-between-removals $\theta_1$. Applicant's method then searches two or more Gamma Confidence Level look-up tables based upon three factors, namely, the number of failed units F, the population of the component within a particular group of machines, and the upper limit on unreliability $P_u$ to determine whether such three factors simultaneously appear within one of such Gamma Confidence look-up tables.

If the three factors do not simultaneously appear on any of the searched Gamma Confidence lookup tables, then the present invention includes the additional step of raising the indicated reliability $R_1$, and repeating the steps of a) computing minimum-mean-time-between-removals $\theta_1$; b) computing the upper limit on unreliability $P_u$; and c) searching the Gamma Confidence Level look-up tables until the three aforementioned factors simultaneously appear within one of such Gamma Confidence look-up tables to provide a Gamma Confidence Level for the population of the component within the group of machines under study.

If the Gamma Confidence Level determined in the above-described fashion is at or below a predetermined percentage, for example, 75%, then the original anticipated life expectancy T is reduced, and the above-described process is repeated, until the Gamma Confidence Level is above the predetermined percentage. Finally, components within the particular group of machines under study are replaced when the usage of the component reaches the minimum-mean-time-between-removals $\theta_1$ computed during the last iteration of the above described process.

Preferably, the computational steps of the method set forth above are performed with the aid of a computer, such as a conventional desktop or laptop personal computer. The values for anticipated life expectancy T, indicated reliability $R_1$, time increment t, number of failed units F, and the component population, are supplied as input data to a computer program, as by keyboard entries. The computer operates a computer software program to compute minimum-mean-time-between-removals $\theta_1$, the upper limit on unreliability $P_u$, and then searches the Gamma Confidence Level look-up tables which are stored in a memory of the computer. The computer then displays on a conventional computer monitor either the Gamma Confidence Level, or prompts the user to modify the values for anticipated life expectancy T and/or indicated reliability $R_1$, until the aforementioned three factors simultaneously appear within one of the stored Gamma Confidence look-up tables. If desired, the user may then direct the computer to print a summary of the input data and the resulting Gamma Confidence Level, along with the computed values for minimum-mean-time-between-removals $\theta_1$ and the upper limit on unreliability $P_u$.

The present method is preferably repeated at periodic intervals to reassess the Gamma Confidence Level using current (updated) input data. In the preferred form of the present invention, the present method is also repeated after each removal of the pertinent component for cause to reassess the Gamma Confidence Level using current (updated) input data.

DETAILED DESCRIPTION OF THE PREFERRED EMBODIMENT

Figure 1A:
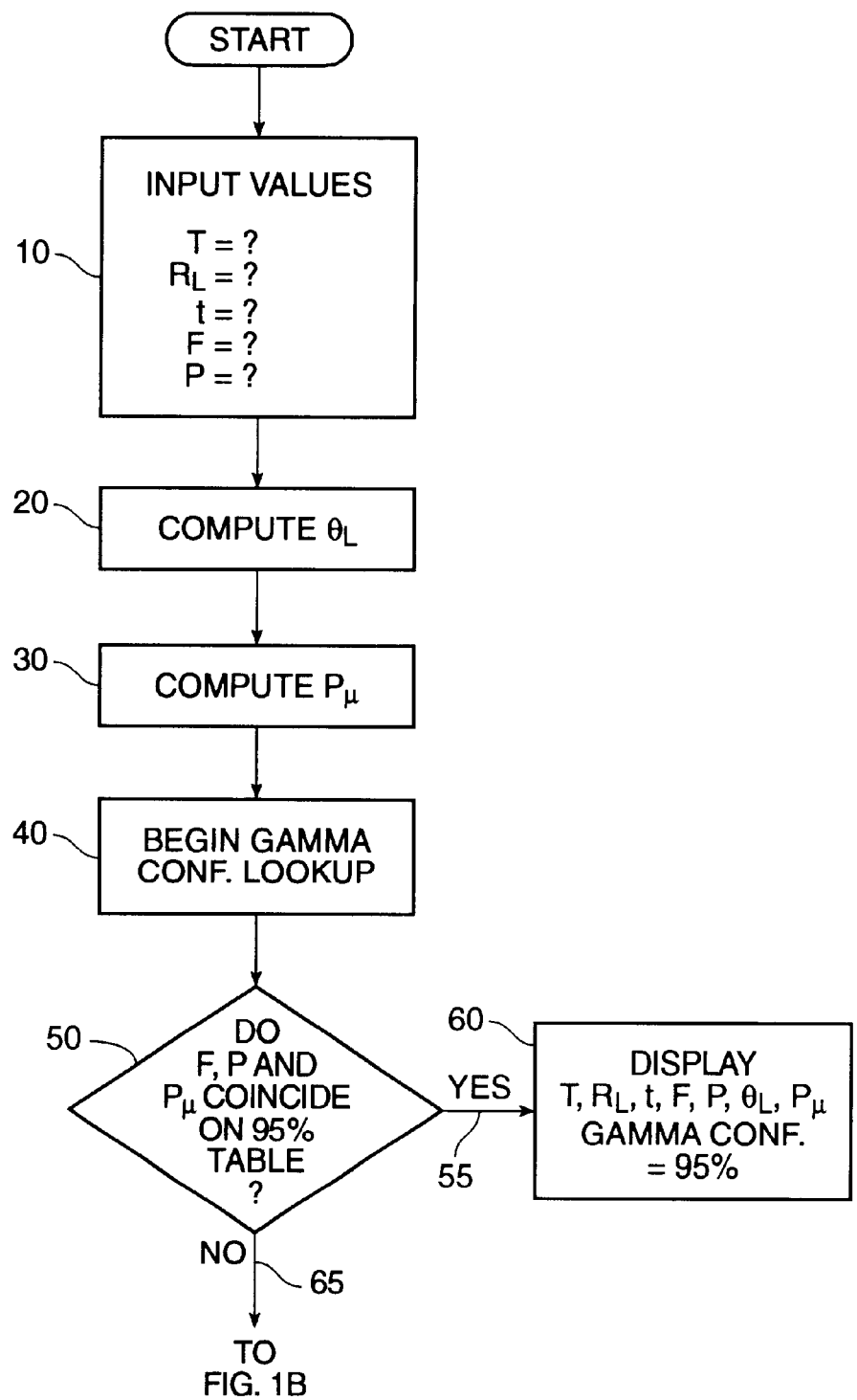
FIGS. 1A, and 1B, form a flowchart illustrating the steps performed by a personal computer in order to practice a preferred form of the method of the present invention.

The basic input factors used by the method of the present invention are defined below:

1. Anticipated life expectancy (T) represents the anticipated life of the component under study; initially, this figure is usually one specified by the manufacturer of the component, e.g., 50,000 hours of operation. Over time, historical data for a component under study can be obtained. Once such historical data has been obtained, the anticipated life expectancy can be based upon such historical data. For example, if history shows that the there were actually three removals due to failures over a short time increment of 10,000 hours of operation, then the reliability manager may elect to set the anticipated life expectancy T equal to 10,000 hours divided by three removals, or 3,333 hours, rather than the anticipated life expectancy initially suggested by the component manufacturer.

2. Indicated reliability ($R_1$) is computed from the removal rate per 1,000 hours of operation, which in turn is based upon the anticipated life expectancy (T) of a component. For example, if the component of interest has an anticipated life expectancy (T) of 50,000 hours, then the removal rate per 1,000 hours is computed as 1,000 hours/50,000 hours=0.02. The indicated reliability ($R_1$) per thousand hours is then computed as $(R_1)=[1/(2.7183)^{0.02}]=0.9802$, where 2.7183 is the natural logarithm e, and 0.02 represents the aforementioned removal rate per thousand hours. Those skilled in the art will appreciate that once an airline or other equipment user has developed a track record with a particular component under study, the user can then use its own historical data for the number of such components removed for cause per 1,000 hours of operation, and thereby compute an actual removal rate per 1,000 hours, instead of computing the removal rate per 1,000 hours based upon the manufacturer's anticipated life expectancy figure.

3. Removal factor (F) represents the number of the particular components under study that failed, or which were actually removed for cause, within a selected short increment of time (t). For example, suppose that only two of the components in the population under study failed within the first 5,000 hours of operation; further assume that one of such components failed after only 1,000 hours of operations, and that the second one of such components failed after 5,000 hours of operation. One practicing the preferred embodiment of the present invention might then have two options. First, the user could set the short time increment t to 6,000 hours, the sum of 1,000 hours and 5,000 hours, and set the removal factor F to 2 removals. In this case, the removal factor F is 2, and the selected short increment of time (t) is 6,000 hours. The second option is to average the 1,000 hour figure and the 5,000 hour figure, and set the removal factor F to be 1 failure over the averaged 3,000 hours of operation. In this case, the removal factor F is 1, and the selected short increment of time (t) is 3,000 hours.

4. Short time increment (t) is explained above in conjunction with the removal factor F, and corresponds to the increment of time over which the failure (or failures) took place when establishing the removal factor F; this number was 3,000 hours in the example set forth above.

5. The population in a particular fleet (P) represents the number of such components of interest that are in active use at any particular time in a particular fleet of aircraft, trucks, etc. For example, if there are two of such components on each aircraft, and there are 50 aircraft active at any given time, then the population P in the particular fleet is 100 units.

The method of the present invention utilizes the input factors described above, and processes such factors with the help of a personal computer to generate a) a minimum-mean-time-between-removals $\theta_1$ based upon the anticipated life expectancy T and the indicated reliability $R_1$; and b) the upper limit on unreliability $P_u$ based upon short time increment t and the minimum-mean-time-between-removals $\theta_1$. In the preferred embodiment of the present invention, the personal computer then determines the Gamma Confidence level (expressed as a percentage). The Gamma Confidence level is preferably obtained by reference to look-up tables stored in the memory of the personal computer. There are a series of such look-up tables for various population sizes (P). For a given population size P, the personal computer considers the removal factor (F) and the calculated upper limit on unreliability $P_u$, and attempts to locate within the look-up table a corresponding Gamma Confidence level.

A minimum acceptable Gamma Confidence level is established; in the preferred embodiment of the present invention, this minimum acceptable Gamma Confidence level is established to be 75%. If, after inputting the various input factors described above, the Gamma Confidence level falls below 75%, then the anticipated life expectancy (T) must be reduced, since the resulting low value for Gamma Confidence level indicates that the original anticipated life expectancy value T was overly optimistic. The effect of reducing input factor T is to raise indicated reliability ($R_1$), and to raise the resulting Gamma Confidence level. Thus, the user reduces the input factor for T, and the personal computer repeats the computations described above.

The aforementioned steps are an iterative process, and are repeated until the Gamma Confidence level remains above the established minimum acceptable level, or 75% in the preferred embodiment. Once the Gamma Confidence level is established at a value above the minimum acceptable Gamma Confidence level, the minimum-mean-time-between-removals $\theta_1$ computed during the last iteration of the above described process is adopted as the period of time at which the component under study must be replaced. Accordingly, this particular component under study is removed from each aircraft, truck, or other equipment, and replaced within such time period $\theta_1$ in order to maintain reliable performance. If components within the population under study have already been in the field in excess of the minimum-mean-time-between-removals $\theta_1$ computed during the last iteration of the above described process, then those components need to be removed and replaced as soon as possible.

As mentioned above, the minimum-mean-time-between-removals $\theta_1$ is computed based upon the anticipated life expectancy T and the indicated reliability $R_1$. Preferably, the minimum-mean-time-between-removals $\theta_1$ is computed according to the following formula:

$$\theta_1 = T/[\log^e (1/R_1)].$$

Also as described above, upper limit on unreliability $P_u$ is computed based upon short time increment t and the minimum-mean-time-between-removals $\theta_1$. Preferably, this computation is made in accordance with the following formula:

$$P_u = 1 - e^{-x},$$

wherein e is the natural logarithm, and x equals short time increment t divided by the minimum-mean-time-between-removals $\theta_1$.

The Gamma Confidence level risk tables stored in the personal computer are derived from data compiled by the American Society for Quality. These tables are set forth in a book entitled "Reliability: Management, Methods, And Mathematics" by David K. Loyd and Myron Lipo, published by Prentice-Hall, Fifth Printing 1984, and the contents of such publication are hereby incorporated by reference as if completely set forth herein. These tables are provided as a series of tables for various Gamma Confidence levels, such as 95%, 90%, 85%, 80%, 75%, 70%, etc. Each such lookup table makes use of the input factors F (removal rate factor), P (population), and upper limit on unreliability $P_u$. These lookup tables were initially designed to indicate the minimum size of a sample to be tested for a short increment of time t to assure a mean-time-between-failures $\theta_1$ for an allowable number of failures F, and for a given Gamma Confidence Level. These lookup tables were originally constructed so that the vertical axis represent number of failures F, the horizontal axis represents the ratio of short time increment t divided by mean-time-between-failures $\theta_1$, and wherein the matrix of values within the table represents the minimum size of the sample to be tested to ensure the particular Gamma Confidence Level (e.g., 90%); thus, as such lookup tables were originally designed, the removal factor F effectively selects the row of the lookup table, the ratio of the short increment of time t relative to the minimum-mean-time-between-failures $\theta_1$, effectively selects the column of the lookup table, and the population value in the intersecting row and column represents the minimum sample size to be tested over short time increment t in order to ensure a particular Gamma Confidence Level for a mean life corresponding to the mean-time-between-failures $\theta_1$.

These Gamma Confidence Level lookup tables are adapted to the present invention by treating the matrix of values within the table as being the population of the component under study, and by treating the value computed for the upper limit on unreliability $P_u$ as if it were the ratio of the short increment of time t relative to the minimum-mean-time-between-failures $\theta_1$. Use of the upper limit on unreliability $P_u$, rather than the actual ratio of the short increment of time t relative to the minimum-mean-time-between-failures $\theta_1$, serves to tighten up the Gamma Confidence Level. Thus, based upon values for removal factor F, short increment of time t, minimum-mean-time-between-failures $\theta_1$, the resulting upper limit on unreliability $P_u$, and the population P, the personal computer can determine whether these values coincide on any of the Gamma Confidence lookup tables stored in the personal computer. It should be noted that the personal computer makes use of an interpolation algorithm to interpolate values between the discrete values stored in the lookup table. For example, suppose that the 90% Gamma Confidence Level lookup table has the value 12 for the population size when F equals 2 in the column corresponding to $t/\theta_1$, equals 0.5, and that the table has the value 28 for the population size when F equals 2 in the column corresponding to $t/\theta_1$, equals 0.2. If the actual value for the upper limit on unreliability $P_u$ is, say, midway between 0.5 and 0.2, or 0.35, then the computer software interpolates a midpoint population size between 12 and 28, or 20.

In the preferred embodiment, the 95% Gamma Confidence level lookup table is consulted first. If the aforementioned factors do not coincide on the 95% Gamma Confidence lookup table, then the 90% Gamma Confidence lookup table is consulted, and so forth. If, by the time one reaches the 75% Gamma Confidence lookup table, the aforementioned factors do not coincide on any of the lookup tables, this is indicative of the indicated reliability value $R_1$ being too low. The user must then raise the value for $R_1$, which may simply be a matter of lowering the value for anticipated life expectancy T.

In order to practice the present invention in the best manner possible, each component of the population under study is preferably uniquely identifiable with its own unique Serial Number and/or airline part number for tracking purposes. This unique Serial Number or part number might be affixed to each such component with a machine-readable bar code label, for example. In addition, records must be kept for each such component, including the dates on which each such component in the population under study was installed, the date each such component was removed for cause, and the number of flight hours or cycle time during which each such component has been operated.

The software used to operate the personal computer in practicing the present process is preferably a computer model simulation program called GPSS. The GPSS simulation software was originally designed to run on a computer mainframe using the IBM OS/2® operating platform.

However, more recently, the GPSS simulation software has been adopted to run on a personal computer using the Microsoft Windows® operating system. This Windows®-based version of the GPSS software is available from Springer Cox of Holly Springs, N.C.

Figure 1B:
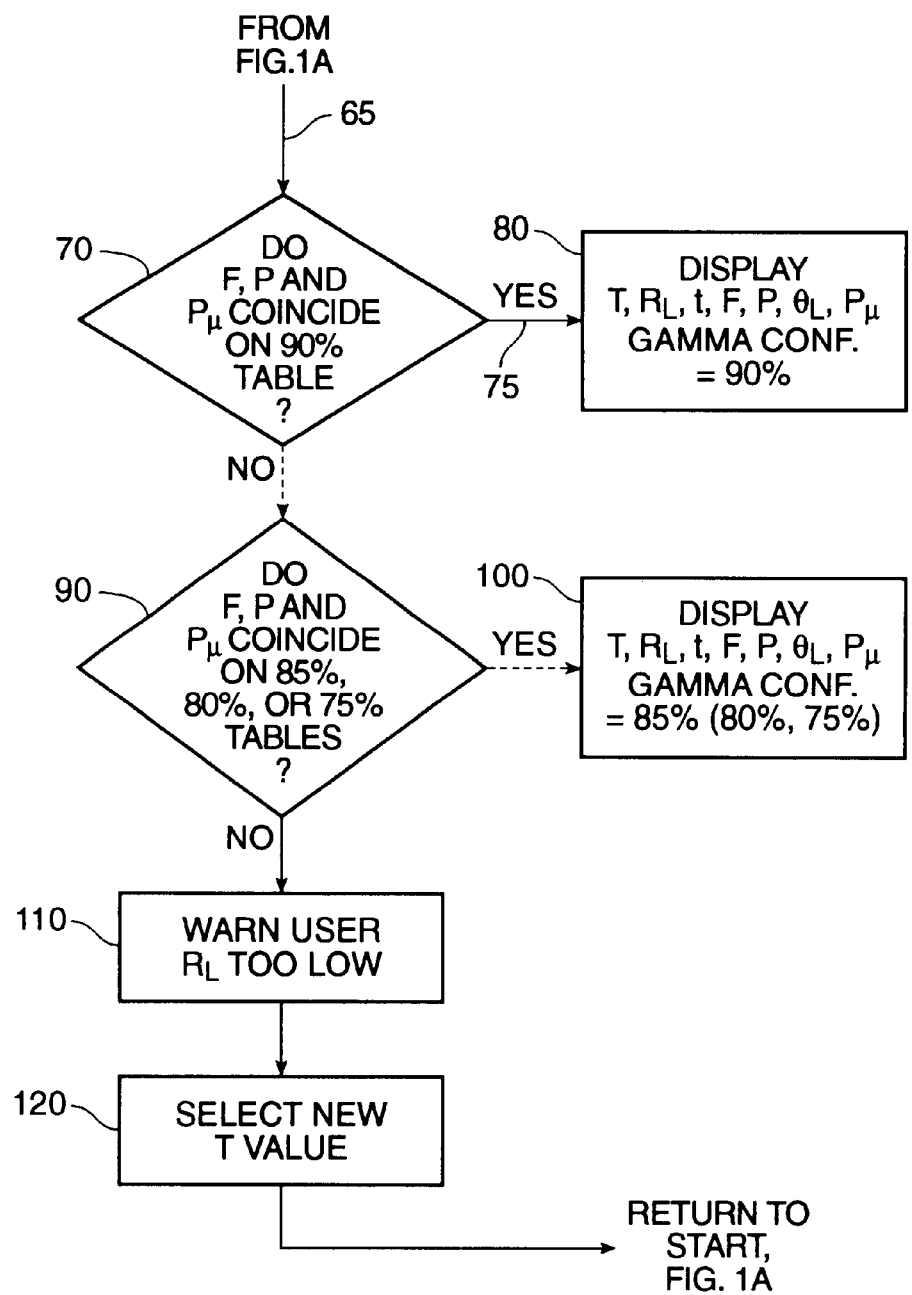

The steps performed by the software used to program the personal computer in order to practice the method of the present invention are illustrated in the flowchart presented within FIGS. 1A, and 1B. In initial step 10, a user is prompted to input various factors, including the anticipated life expectancy T for the component, the indicated reliability $R_1$ for the component, the short time increment t over which one or more units of the component produced a failure, the removal factor F (i.e., the number of failed units of the component that had to be replaced over the short time increment t), and the population of the component within the particular fleet or group under study. In this regard, it has been noted above that indicated reliability $R_1$ can be computed based upon the anticipated life expectancy (T) of a component. It will be recalled that, in an example presented above, it was assumed that the component of interest had an anticipated life expectancy (T) of 50,000 hours, that the removal rate per 1,000 hours was computed as 1,000 hours/ 50,000 hours=0.02, and that the indicated reliability ($R_1$) per thousand hours was then computed as $(R_1)=[1/(2.7183)^{0.02}]=0.9802$. If this method of determining indicated reliability $R_1$ is adopted by the reliability manager, then it is not really necessary to separately input indicated reliability $R_1$, as the computer program can compute this value based only upon the input value for anticipated life expectancy T.

The next step 20 is to compute the minimum-mean-time-between-failures $\theta_1$ based upon the anticipated life expectancy T and the indicated reliability $R_1$ in the manner described above. The program then proceeds to step 30, where it computes the upper limit on unreliability $P_u$ based upon time increment t and the minimum-mean-time-between-removals $\theta^1$ in the manner described above. Step 40 represents the beginning of the lookup table search procedure for establishing the Gamma Confidence level. As shown, control proceeds to decision diamond 50 for checking to see whether the removal factor F, the population of the component within the fleet, and the upper limit on unreliability $P_u$ coincide on the 95% Gamma Confidence lookup table. If so, then the computer software proceeds along path 55 to box 60 and displays a summary of the input factors for anticipated life expectancy T, indicated reliability $R_1$, removal factor F, short time increment t, and the population of the component in the fleet P, the computed values for minimum-mean-time-between-failures $\theta_1$ and upper limit on unreliability $P_u$, and the resulting Gamma Confidence Level of 95%. At the request of the user, this display can be printed as a report on a printer connected to the personal computer.

On the other hand, if the removal factor F, the population of the component within the fleet, and the upper limit on unreliability $P_u$ do not coincide on the 95% Gamma Confidence lookup table, then control proceeds along path 65 to box 70 wherein the above-described process is repeated to determine whether these three factors coincide on the 90% Gamma Confidence lookup table. If so, control proceeds along path 75 to box 80, and a report is displayed, similar to the one described above for box 60, except that the reported Gamma Confidence level is 90%.

If the removal factor F, the population of the component within the fleet, and the upper limit on unreliability $P_u$ do not coincide on the 90% Gamma Confidence lookup table, then control proceeds to box 90 which indicates that the aforementioned steps are repeated for the 85% Gamma Confidence level, and if necessary, for the 80% and 75% Gamma Confidence levels. As indicated if the three aforementioned factors coincide on the 75% Gamma Confidence lookup table, then a report is generated indicating such result, as represented by box 100. However, if the three factors do not coincide on the 75% Gamma Confidence lookup table, then control proceeds to box 110, at which the computer software causes the user's screen to display a warning message indicating that the indicated reliability $R_1$ is too low. The user can then boost the indicated reliability value by reducing the anticipated life expectancy value T, as indicated by box 120. The above-described process is then repeated by returning to step 10, this time using the reduced value for anticipated life expectancy T. These steps are repeated until a Gamma Confidence level of 75% or more is obtained.

Once the Gamma Confidence level is maintained at 75% or more, the resulting mean-time-between-failures value $\theta_1$ is compared to the flight time already logged by the components under study within the population. If any of such components have already logged flight hours in excess of the computed mean-time-between-failures value $\theta_1$, then such component should immediately be removed and replaced. As mentioned above, this analysis is preferably repeated at regular intervals, for example, every three months. In addition, the analysis is preferably repeated any time that one of the components under study is replaced due to a failure.

While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. A method for establishing a confidence level in a replacement schedule for a component used within a group of machines, said method comprising the steps of:

a. selecting an anticipated life expectancy T for the component;

b. establishing an indicated reliability $R_1$ for the component;

c. establishing a time increment t over which one or more units of the component produced a failure;

d. establishing a number of failed units F of the component that had to be replaced over the time increment t;

e. determining a number P of units the population of the component in active use within a particular group of such machines;

f. computing a minimum-mean-time-between-removals $\theta_1$ based upon the anticipated life expectancy T and the indicated reliability $R_1$;

g. computing an upper limit on unreliability $P_u$ based upon time increment t and the minimum-mean-time-between-removals $\theta_1$;

h. searching a plurality of Gamma Confidence Level look-up tables based upon three factors, namely, the number of failed units F, the population of the component within a particular group of machines, and the upper limit on unreliability $P_u$ to determine whether such three factors simultaneously appear within one or more of the plurality of Gamma Confidence look-up tables;

i. if the three factors do not simultaneously appear on any of the plurality of Gamma Confidence lookup tables, then raising the indicated reliability $R_1$ in step b., and repeating steps f., g., and h. until the three factors simultaneously appear on one of the plurality of look-up tables;

j. determining, based upon steps h. and i., the Gamma Confidence Level for the population of the component within the group of machines;

k. if the Gamma Confidence Level determined in step j. is 75% or less, then reducing the anticipated life expectancy T, and repeating steps f., g., and h. until the Gamma Confidence Level is 75% or higher; and l. replacing the component within the particular group of machines when the usage of the component reaches the minimum-mean-time-between-removals $\theta_1$ computed in step f.

2. The method recited by claim 1 wherein said step of establishing an indicated reliability $R_1$ for the component is based in part upon the anticipated life expectancy T for the component selected in step a.

3. The method recited by claim 2 wherein said step of establishing an indicated reliability $R_1$ for the component includes the step of computing indicated reliability $R_1$ according to the formula $$R_1 = [1/(2.7183)^n]$$

where 2.7183 is the natural logarithm e, and where n is the removal rate per thousand hours.

4. The method recited by claim 1 wherein said steps f., g., h., i. and j. are performed by a computer, and wherein said method includes the step of inputting to the computer the values established in steps a., b., c., d. and e.

5. The method recited by claim 1 wherein said method is repeated at periodic intervals to reassess the Gamma Confidence Level using current input data.

6. The method recited by claim 1 wherein said method is repeated after each removal of the component for cause to reassess the Gamma Confidence Level using current input data.

\* \* \* \* \*